United States Patent
Li

(10) Patent No.: US 7,609,891 B2
(45) Date of Patent: Oct. 27, 2009

(54) EVALUATION OF ELEMENT DISTRIBUTION WITHIN A COLLECTION OF IMAGES BASED ON PIXEL SCATTERNESS

(75) Inventor: Pingshan Li, Sunnyvale, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 571 days.

(21) Appl. No.: 11/217,942

(22) Filed: Aug. 31, 2005

(65) Prior Publication Data

US 2007/0047806 A1 Mar. 1, 2007

(51) Int. Cl.
*G06K 9/46* (2006.01)
(52) U.S. Cl. ...................................... 382/190
(58) Field of Classification Search .............. 382/100, 382/181, 190, 232, 240, 248, 250, 276, 284; 341/79; 358/432, 433, 261.2, 261.3, 348.1; 375/240.02–240.03, 240.11–240.16; 708/300, 708/308, 313, 317, 400–405, 203
See application file for complete search history.

(56) References Cited

U.S. PATENT DOCUMENTS

| | | | | |
|---|---|---|---|---|
| 5,280,547 A | * | 1/1994 | Mahoney | ............ 382/302 |
| 5,369,714 A | * | 11/1994 | Withgott et al. | ............. 382/177 |
| 5,568,569 A | * | 10/1996 | Golin | ............ 382/236 |
| 5,610,658 A | * | 3/1997 | Uchida et al. | ............ 348/416.1 |
| 6,704,454 B1 | * | 3/2004 | Spence et al. | ............ 382/240 |
| 2004/0161153 A1 | * | 8/2004 | Lindenbaum | ............ 382/209 |

OTHER PUBLICATIONS

G. Pass and R.Zabih, "Histogram Refinement for Content-Based Image Retrieval", Proc. IEEE Workshop on Applications of Computer Vision, Sarasota, Florida, Dec. 1996, pp. 96-102.

* cited by examiner

*Primary Examiner*—Samir A. Ahmed
*Assistant Examiner*—Atiba O Fitzpatrick
(74) *Attorney, Agent, or Firm*—John P. O'Banion

(57) ABSTRACT

A method of evaluating element distribution within a data set, such as pixel characteristics whose scatterness is quantified. Scatterness is evaluated for individual scale levels as the image is merged through smaller scale levels. At each level, every pixel block (i.e., 2×2) in the region of interest merges to one pixel to form the next level. Select characteristics of the pixels are assessed in the merge, and the image may be simplified to fewer pixel states so the merges require less processor overhead. In one merge mode if any pixel in the block has the desired characteristic, then the resulting merged pixel is set with that characteristic. The merging rate of the pixels is used to determine the scatterness for the pixel distribution. A scatterness sequence can be used separately or in combination with known techniques for comparing images in applications such as search and classification.

21 Claims, 5 Drawing Sheets

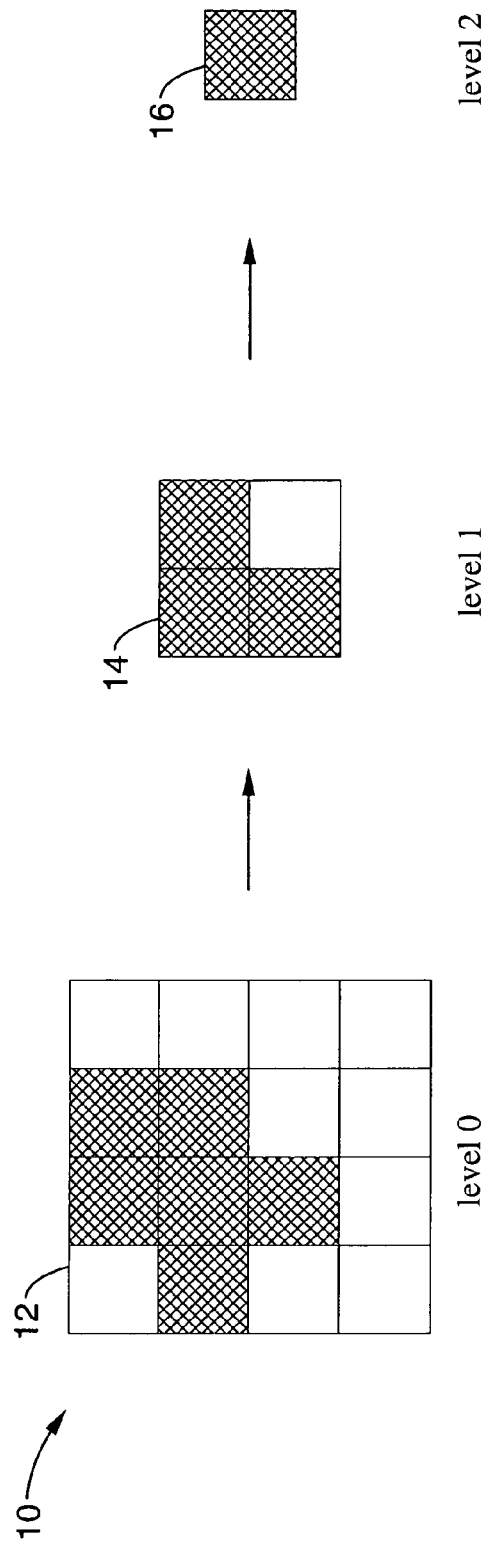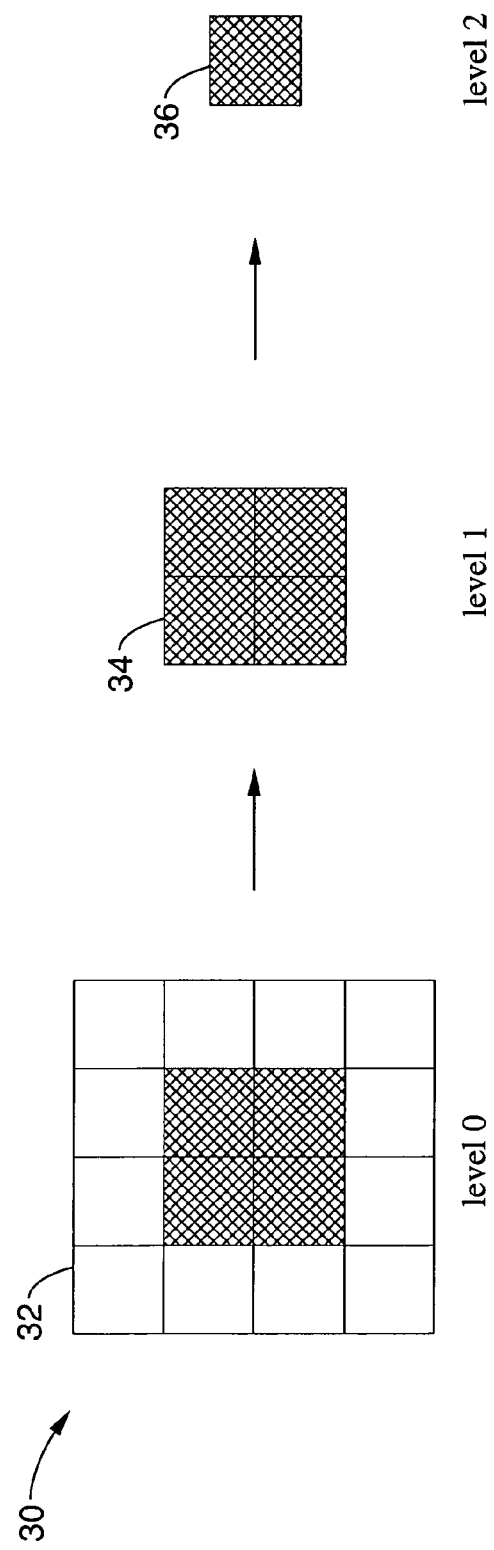

EVALUATION OF ELEMENT DISTRIBUTION WITHIN A COLLECTION OF IMAGES BASED ON PIXEL SCATTERNESS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C. F. R. § 1.14.

BACKGROUND OF THE INVENTION

1. Field of the Invention

This invention pertains generally to assessing distribution within a related data set, and more particularly to a method of quantifying the distribution of pixel characteristics within images.

2. Description of Related Art

Increasing attention is being directed to methods of multimedia categorization. Perhaps one reason for this stems from the inclusion of content on the web and on organizational databases, and the requisite need of searching through a vast content store to select the desired content. Categorization as to proportion of colors is well known, however, this factor alone can be very misleading. Colors within an image are subject to different distributions according to the subject. For example, an image of a person wearing a red shirt may not be distinguished from a scattered field of red flowers.

One researcher has attempted to use histogram refinement to provide content-based image retrieval, in which an attempt is made to classify images with similar color histograms but with different spatial coherence. The method uses color coherence vectors in which pixel groups are determined by computing connected components, wherein only pixels in the same class are compared. However, this method is only effective when pixels form connected groups, while it does not distinguish groups with different shapes and variations. Furthermore, this method is unable to evaluate the pixel distribution at different resolution scales.

Accordingly a need exists for a method of evaluating the distribution of pixel characteristics within images. The present invention fulfills that need and others and can be readily implemented with low processing overhead on both new and existing systems.

BRIEF SUMMARY OF THE INVENTION

A method is described for evaluating a distribution of elements within a collection of elements, such as within any data set. Although the method can be practiced on any form of data having a plurality of entries, the method is particularly well suited for use in quantifying the distribution of pixel characteristics within an image, collection of images, video or the like. The invention utilizes a measure of scatterness for determining pixel distribution of select pixel characteristics (i.e., color and/or intensity either singly or in any desired range). The image is considered to be scalable in that particular groups of pixels (i.e., pixel blocks) can be merged into smaller groups, or more preferably, single pixel units, as the image is scaled.

The method described herein is configured to classify images based on pixel scatterness/dispersion even if those pixels do not form any connected regions. In addition, the method can classify pixel regions with different eccentricities. Furthermore, the scatterness sequence provided reflects pixel distribution at different resolution scales.

Scatterness is preferably evaluated herein at each individual scale level. The sequence of scatterness information as the image scale is changed, such as in response to merging, provides a scatterness sequence. In one embodiment scatterness is determined as a scatterness sequence as the image is merged down to smaller and smaller images. For example, each pixel block in the original image, or portion of the image, is merged into a single pixel, reducing the size of the image by a factor of four if the pixel group contains four pixels. The sequence of scatterness provides quantification of the distribution of the given pixel characteristic, or characteristics, across a range of merges.

At each scale level within the merge process every pixel block, such as a 2×2 pixel block, in the region of interest merges to a single pixel to form the next level. The merging rate of the pixels is used to determine the scatterness for the pixel distribution. A scatterness sequence can be used to provide pixel distribution information of entire images or regions of interest among images, for example toward facilitating the implementation of applications such as image classification. Distribution information based on scatterness can be used separately or in combination with other techniques for classifying images, sequences of images, and/or video in relation to each other or into categories for which specific criterion have been established.

The invention is amenable to being embodied in a number of ways, including but not limited to the following descriptions.

One embodiment of the invention can be generally described as a method of quantifying scatterness within images or video frames based on characteristics, comprising the steps of:

(a) merging each block of pixels (i.e., 2×2 pixels) from within a plurality of pixel blocks within an image into a collection of single pixels (each block merged into a single pixel, wherein image size is successively reduced);

(b) registering the number, or proportion, of pixels having a desired pixel characteristic, or range of characteristics, within the pixels as a measure of scatterness for that characteristic (performed over the entire image or any portion thereof);

(c) repeating steps (a) and (b) until a desired level of merging is reached (e.g., desired level may be based on number of iterations, resultant image size, reaching a scatterness limit, arrival at a single pixel, and so forth); and (d) generating scatterness sequence information in response to the registration of characteristics for at least two of the merges.

The method is described as being practiced on images or frames of video which are in two dimensions, however, the technique is also well suited for use with more than two dimensions, such as with three dimensional holographic image data or holographic video streams.

The pixel characteristics being assessed in the image, or portion of the image, can comprise color characteristics, intensity characteristics, or a combination of color and intensity characteristics. Furthermore, the technique is amenable for assessing any discernable characteristic of the pixels within the pixel blocks.

Image classification can be performed using the method by comparing the scatterness sequence according to a pixel characteristic, group of pixel characteristics, or range of characteristics. In addition, the comparison preferably includes considering pattern and/or rate of change in the generated scatterness sequence.

In one embodiment the merging of pixel blocks into a collection of single pixels comprises setting the merged pixel to have the given characteristic if any of the pixels comprising the block of pixels possesses that given characteristic. By way of example the characteristics or range of characteristics is selected by a user from an interface when performing image categorization, and may be predetermined in other way according to the application. In another embodiment, pixels in other pixel groups which have not yet been merged are subject to being changed in response finding the selected characteristics in nearby pixels of the pixel block being merged. It should be appreciated that other patterns of merging can also be adopted without departing from the teachings of the present invention.

Embodiments of the present invention can provide a number of beneficial aspects which can be implemented either separately or in any desired combination without departing from the present teachings.

An aspect of the invention is that of providing a method for quantifying pixel distribution within an image.

Another aspect of the invention is to provide a method by which selected characteristics, multiple characteristics, or ranges of characteristics of the pixels can be evaluated in response to distribution.

Another aspect of the invention is a method of quantifying pixel distribution within an image, or any desired portion of the image.

Another aspect of the invention is a method of quantifying pixel distribution within an image after a process of simplifying the image into fewer possible pixel states based on the pixel characteristics, or range of pixel characteristics, upon which the image is being evaluated.

Another aspect of the invention is to provide a method for rapidly determining a scatterness value for an image.

Another aspect of the invention is to provide a method for rapidly determining a scatterness sequence for an image.

Another aspect of the invention is to provide a method for rapidly creating compact scatterness values for use in comparing images.

Another aspect of the invention is to provide a method by which images can be compared during a process of image classification.

A still further aspect of the invention is to provide a method for quantifying scatterness of not only images, but of any image or video comprising two or more dimensions.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a pixel area map according to an aspect of the present invention, showing merging regions of interest with levels 0 through 2.

FIG. 2 is a pixel area map according to an aspect of the present invention, showing a merging process according to Eq. (1).

DETAILED DESCRIPTION OF THE INVENTION

Figure 3:
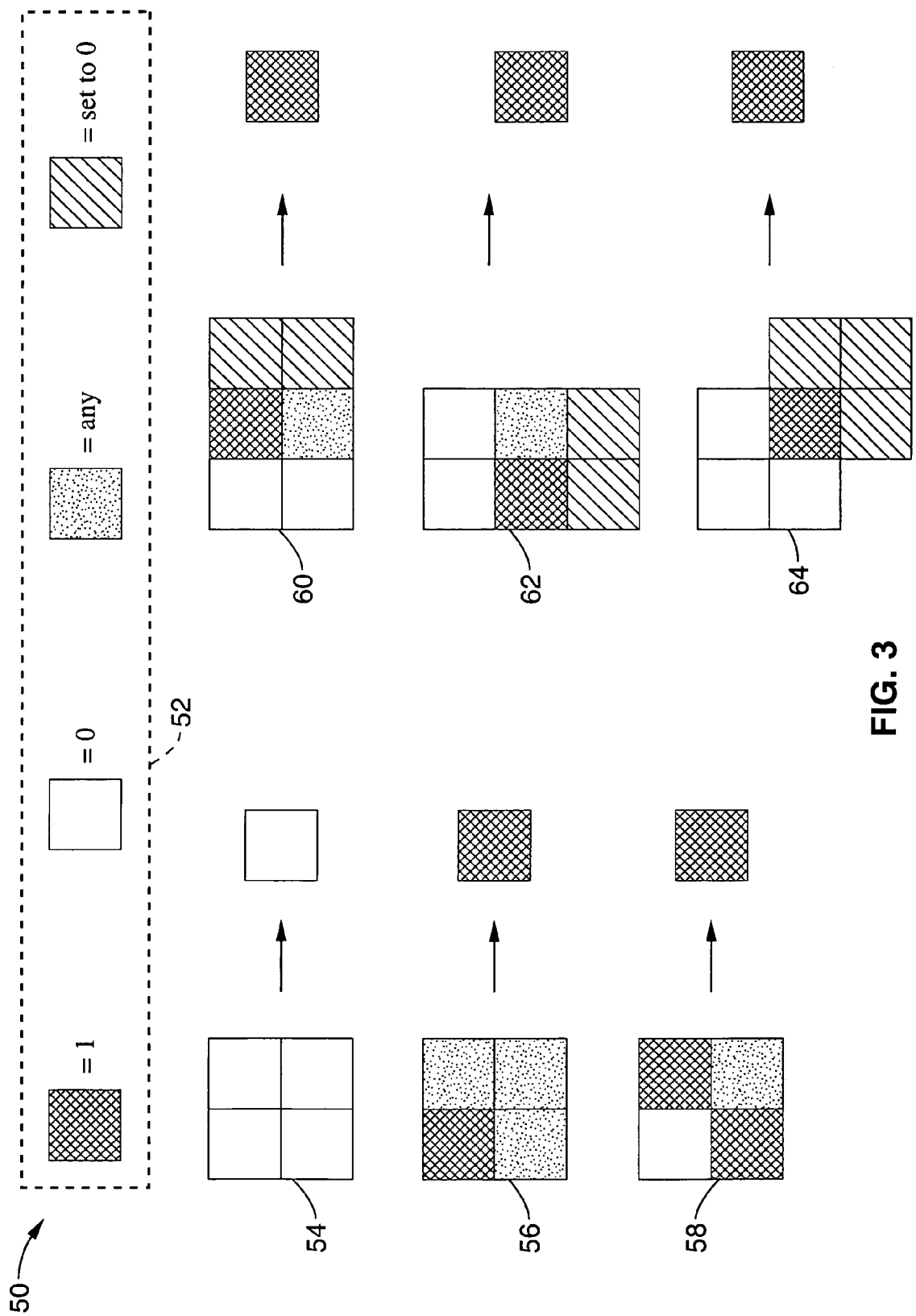
FIG. 3 is a pixel area map of a modified merging process according to an aspect of the present invention.

Referring more specifically to the drawings, for illustrative purposes the present invention is embodied in the apparatus generally shown in FIG. 1 through FIG. 5. It will be appreciated that the apparatus may vary as to configuration and as to details of the parts, and that the method may vary as to the specific steps and sequence, without departing from the basic concepts as disclosed herein.

1. Introduction

Data scatterness can be evaluated using statistical parameters such as variance. However, this type of evaluation is global and cannot describe local distribution. The present invention describes a method for evaluating scatterness within any collection of elements, or data set, and more preferably those that can be modeled after pixel distribution.

The method of the present invention is particularly well suited for quantization of scatterness of pixel distributions at individual scale levels, as well as across a range of scales as a scatterness sequence. The invention provides a method for categorizing images or video frames, and can be directed to categorizing specific aspects of an image or video frame. For the sake of simplicity the process is described herein based on an image, however, it should be appreciated that the technique generally applies to any multi-element data set which can be modeled as a pixilated representation which exists in at least two dimensions, such as two-dimensional and three-dimensional images and video comprising a sequence of frames.

At each level, every pixel block (i.e., a 2×2 pixel block according to one embodiment) merges to 1 pixel to form the next level. The merging rate of the pixels is used to determine the scatterness for pixel distribution at that level. A scatterness sequence is a series of scatterness values across a range of scale levels, or even all scale levels until a single pixel result is reached. The scatterness values describe the local pixel distribution at detailed levels, and the global distribution at coarse levels. It can be used to compare the pixel distribution of regions of interest among images for applications such as image searching and classification.

The method according to the present invention is configured as programming adapted for execution by a microprocessor, digital signal processor, or other form of processing element associated with a system which is configured for, or adapted to, generate pixel characteristic distribution information based on scatterness, or optionally to perform image selection or classifications based scatterness.

2. Image Simplification Based on Pixel Characteristics

The method of determining scatterness pixel distribution according to the invention provides for determining the distribution of pixels which possess a given set of characteristics. These characteristics may be anything detectable within a pixel, for example color, intensity, or combinations of color and intensity and so forth. Furthermore the characteristics could comprise one or more discrete characteristics, ranges of characteristics, or a combination thereof.

It will be appreciated that assessing complex characteristics, such as colors within a given range, or more particularly ranges of characteristics, involves more processor overhead than would for example distinguishing pixels having only one of two possible states, such as black or white. Therefore, according to one aspect of the invention, the images are simplified in response to the desired characteristics wherein fewer possible states exist during the merge processes. In one embodiment each pixel of the simplified image is set in either a first state indicative of pixels lacking the desired characteristic, or a second state indicative of pixels possessing the desired pixel characteristics. The simplification step can be performed prior to merging or during the merging process and, in either case, results in reducing necessary processor overhead.

In the following descriptions of the method the simplified pixel characteristics are considered to be either in a first state (white) which do not match the characteristics, or in a second state (black) which do match the characteristics being quantified.

3. Scatterness Quantification

FIG. 1 illustrates an example embodiment 10 in which pixels within pixel groups are merged into single pixels, lowering the pixel count of the image or portion of the image under consideration. Two merges are depicted, in particular as level-0 12 is merged to level-1 14, and then as level-1 14 is merged to level-2 16. Scatterness is an estimation of the level of pixel scattering as utilized for determining data distributions, and the like. Considering the pixel area image at level-0 12 shown in FIG. 1, a 4×4 pixel area is shown in which the black pixels indicate the pixels having characteristics which match characteristics for which the distribution information is sought. This simple example image is divided into four blocks with each block containing 2×2 pixels. An image is generated at level-1 14 with each pixel corresponding to each block in the previous level. A pixel at level-1 14 is set to be black if the corresponding 2×2 pixel block at the previous level (level-0 12) contains at least one black pixel; otherwise, it is set to be white. In one embodiment of the invention this process is repeated until the image at the current level contains only a single pixel, such as shown by level-2 16. Alternatively, the merging process can be executed to a specific depth, until reaching a particular scale, until a particular value of scatterness is provided, and so forth. The merging process can also be represented mathematically.

Let $f_i[m,n]$ denote the image pixel at position [m,n] at ith level, 1 denotes a black pixel, and 0 denotes the white pixel, then image $f_{i+1}$ is the merged resultant image determined by the following relation applied to each pixel block.

$$f_{i+1}[m,n] = \begin{cases} 0, & \text{if } f_i[2m, 2n] = f_i[2m+1, 2n] \\ & \quad = f_i[2m, 2n+1] \\ & \quad = f_i[2m+1, 2n+1] \\ & \quad = 0 \\ 1, & \text{otherwise} \end{cases} \quad (1)$$

Let c(i) denote the area of the region of interest, or the total number of black pixels at level i. The following can be easily seen.

$$\lceil c(i-1)/4 \rceil \leq c(i) \leq c(i-1) \quad (2)$$

In Eq. (2) the $\lceil \cdot \rceil$ is a ceiling operator. The scatterness at level i, denoted by $s_i$, is defined by the following.

$$s_i = \frac{c(i)}{\lceil c(i-1)/4 \rceil} - 1 \quad (3)$$

In the above $s_i$ is not defined if c(i−1)=0. From Eq. (2) and Eq. (3) the following can be seen about the scatterness $s_i$ at level i.

$$0 \leq s_i \leq 3 \quad (4)$$

Larger values of $s_i$ indicate that the pixels are more scattered, while small values of $s_i$ indicate higher levels of clustering.

FIG. 2 illustrates an example embodiment 30 of a merging process according to Eq. (1), shown being merged from level-0 32 to level-1 34 and finally to the last level, level-3 36. The merging scheme discussed above may not reflect the scatterness of pixel distribution in all situations. For example, consider the 2×2 pixel region shown in FIG. 2. At the next level, a 2×2 pixel region still exists which gives a small value of $s_i$. Modifying this merging process to overcome this problem, the 2×2 pixel blocks are processed row by row from, such as from top to bottom, and from left to right for each row.

FIG. 3 illustrates by way of example embodiment 50 another merging process in which adjacent pixel adjustments are made, such as to zero, to provide improved scatterness evaluation when performing the merge in a row-by-row order from top to bottom. It should be noted that adjustments are only made to pixels within pixel groups which have not yet been merged wherein the scan direction is important to the execution of this method.

A legend 52 depicts what each of the four block types represents. A dark pixel (=1) is used herein to indicate that the pixel matches the selected characteristics for which distribution information or categorization is sought. A white pixel (=0) is used to indicate that the pixel does match the selected characteristics. An "any" pixel represents a "don't care" situation, as the merge is already determined by other pixels in the pixel group. A "set to 0" pixel represents a state by which modification of nearby unmerged pixels is to be performed to improve the utility of the scatterness information generated.

The block of zero pixels 54 merges to a single pixel having a zero state. The block 56 having a single one pixel and three "any state" pixels is shown merged to a single pixel having a one state. The block with a zero pixel, two one pixels, and an "any state" pixel is shown being merged to a single pixel having a one state. The block 60 having two left-side zero pixels and a right-side one pixel over an "any state" pixel is shown merging to a single pixel having a one state. In addition the pixels to the right of the one pixel (upon which merge has not yet been executed) in the next pixel block are shown being set to zeros. Block 62 having two top-side zero pixels and a bottom-side one pixel adjacent an "any state" pixel is shown merging to a single one pixel. In addition the pixels underneath the one pixel row (upon which merge has not yet been executed) in the next lower row of pixel blocks are shown being set to zeros. In pixel block 64 a single one pixel is shown in the lower right which is merged to a single one pixel. This example also shows setting to zero a group of three pixels which are adjacent to the one pixel in the block of pixels. It should be appreciated the process of adjusting pixel state in nearby pixel groups can be adjusted in response to any desired scan pattern for merging pixels groups.

The merging process can be summarized by the following equations.

$$f_{i+1}[m, n] = 0 \quad \text{if} \quad \begin{cases} f_i[2m+1, 2n] = 0, \\ f_i[2m, 2n+1] = 0, \\ f_i[2m+1, 2n] = 0, \\ f_i[2m+1, 2n+1] = 0; \end{cases} \quad (5)$$

$$f_i[m, n] = 1 \quad \text{if} \quad f_i[2m, 2n] = 1; \quad (6)$$

$$f_{i+1}[m, n] = 1 \quad \text{if} \quad \begin{cases} f_i[2m+1, 2n] = 0, \\ f_i[2m, 2n+1] = 1, \\ f_i[2m+1, 2n] = 1; \end{cases} \quad (7)$$

$$\begin{rcases} f_{i+1}[m, n] = 1, \\ f_i[2m, 2n+2] = 0, \\ f_i[2m+1, 2n+2] = 0 \end{rcases} \text{if} \begin{cases} f_i[2m, 2n] = 0, \\ f_i[2m+1, 2n] = 0, \\ f_i[2m, 2n+1] = 1; \end{cases} \quad (8)$$

$$\begin{rcases} f_{i+1}[m, n] = 1, \\ f_i[2m+2, 2n] = 0, \\ f_i[2m+2, 2n+1] = 0 \end{rcases} \text{if} \begin{cases} f_i[2m, 2n] = 0, \\ f_i[2m+1, 2n] = 1, \\ f_i[2m, 2n+1] = 0; \end{cases} \quad (9)$$

$$\begin{rcases} f_{i+1}[m, n] = 1, \\ f_i[2m+1, 2n+2] = 0, \\ f_i[2m+2, 2n+1] = 0, \\ f_i[2m+2, 2n+2] = 0 \end{rcases} \text{if} \begin{cases} f_i[2m, 2n] = 0, \\ f_i[2m, 2n+1] = 0, \\ f_i[2m+1, 2n] = 0, \\ f_i[2m+1, 2n+1] = 1. \end{cases} \quad (10)$$

A scatterness sequence can thus be determined according to the invention as a sequence of scatterness values at each level. In order to compare the sequences obtained from different images, the scatterness sequence is defined as a function of the number of black pixels (or alternatively white pixels) rather than a function of the scale level of the image, or portion of the image under consideration. Alternatively, the proportion of black pixels (or white pixels) can be considered within the image, or selected portion of the image.

The change in scatterness across the different scale levels is then compared for use in classifying the images. In order to simplify comparisons a compaction process can be performed according to one optional aspect of the invention. By way of example, a base-4 logarithm is used for the number of black pixels to make the sequence more compact. The sequence can be defined as $\{S[k]|k=\log_4[c(i)], S[k]\epsilon\{s_i\}\}$, where $c(i)$ and $s_i$ are described in Eq. (2) and Eq. (3). It should be appreciated, however, that the scatterness information can be processed using alternative mechanisms without departing from the teachings of the present invention.

Two merging methods have been described by way of example embodiment. It will be appreciated, however, that other mechanisms can be adopted for merging blocks into pixels without departing from the teachings of the present invention. Considering guidelines for the pixel (data element) merging scheme, it should be appreciated that the merge need not be from a 2×2 element area mapped to a single pixel, but may be performed with any desired predetermined or variable scaling. In general terms it can be desired to use as few pixels as possible for the next resolution level to represent the pixel distribution at the current level. If the pixels at the current level are clustered together, it can be expected that there should exist very few pixels at the next level. Otherwise there will be many pixels at the next level because the merging rate will be slow when the pixels are scattered. Therefore, by evaluating the ratio between the number of pixels of the two levels, the scatterness of pixel distribution can be evaluated.

4. Image Classification

Figure 4A:
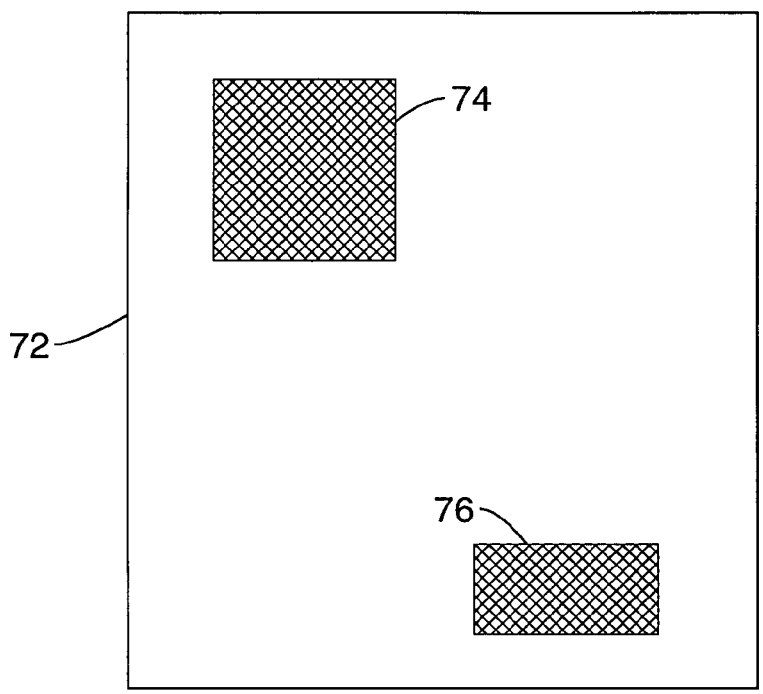
FIG. 4A-4B are pixel map representations within images which are formed in clusters and those which are more distributed, respectively.
Figure 4C:
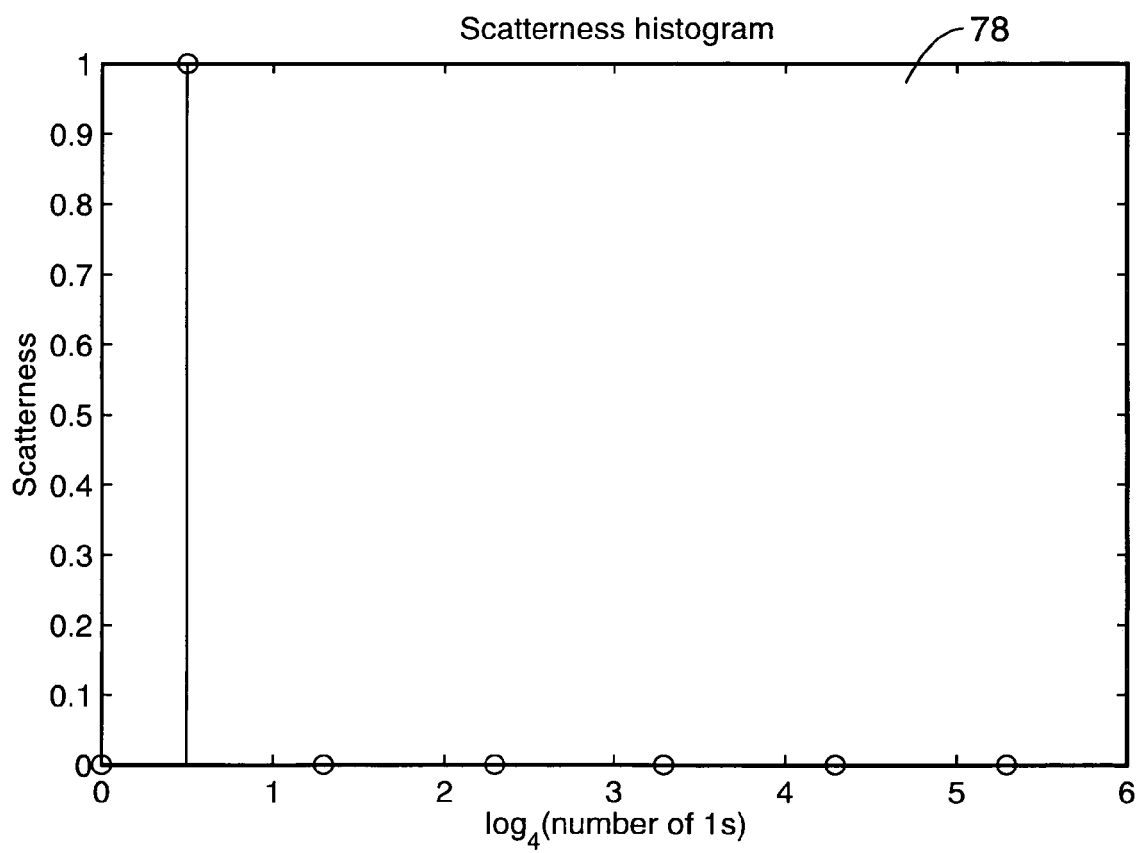
FIG. 4C-4D are graphs of scatterness for the pixel map representations of FIG. 4A-4B.

FIG. 4A-4D illustrates pixel area images and corresponding graphs of scatterness below each image. In the image 72 of FIG. 4A the pixels are clustered locally, but the clusters 74, 76 are widely separated in the viewable area of 256×256 pixels. The black pixels comprise the region of interest with cluster 74 comprising a 64×64 pixel area, while cluster 76 comprises a 64×32 pixels area. Accordingly, the resultant scatterness value from these clusters is small when the number of pixels is large, and becomes large with the number of pixels approaching zero. FIG. 4C is a graph 78 of the scatterness for the image of FIG. 4A.

Figures 4B, 4D:
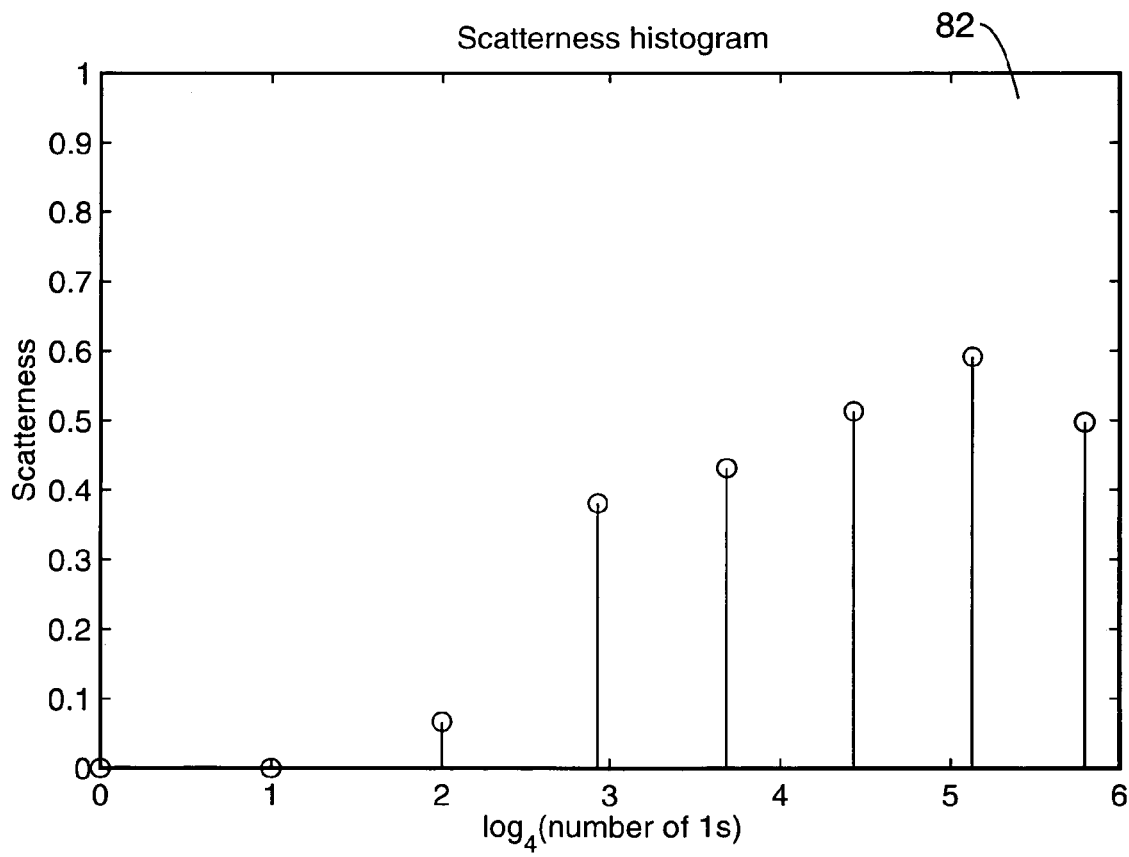

In the image 80 of FIG. 4B depicting text distributed over an area, the scatterness values are large at lower levels, and become small at higher merge levels since the pixels are more evenly distributed globally. From this example, it can be seen that the scatterness sequence shown in chart 82 of FIG. 4D can be used to evaluate the property of the pixel distribution.

In one embodiment of the invention the scatterness sequences are compared in order to classify images into different categories. By way of example, to classify pictures of people, human skin color pixels can be detected in the image as the regions of interest and its scatterness evaluated. Then the scatterness of the pixel distribution can be compared for the regions. The skin color pixels for a group shot tend to be more scattered than those of a close-up portrait where we have one large skin patch. Therefore by comparing the scatterness sequences obtained from the skin color regions, pictures of group shots and portraits can be distinguished in response to scatterness and a scatterness sequence over a range of scales.

Image classification according to the invention can be performed in a number of alternative ways or combinations thereof. For example the scatterness information, such as scatterness sequence information, for an image can be compared with other images, or with classification thresholds, or both to determine how to classify the image. It should be appreciated that an image may fall into a number of different categories. The image is considered to be categorized in response to it being organized with regard to physical location, ordering in a pointer data structure, tagged with categorization information (i.e., text string of categories into which image fits), and other mechanisms by which images having specific characteristics can be more readily located.

The mechanisms utilized for comparing different scatterness sequences is typically application dependent. In most applications pixels are not limited to being either black or white, wherein the process can be more generally considered to allow characterizing images in response to one or more pixel characteristics, or range of characteristics as described in a previous section.

5. Summarizing Scatterness Method

Figure 5:
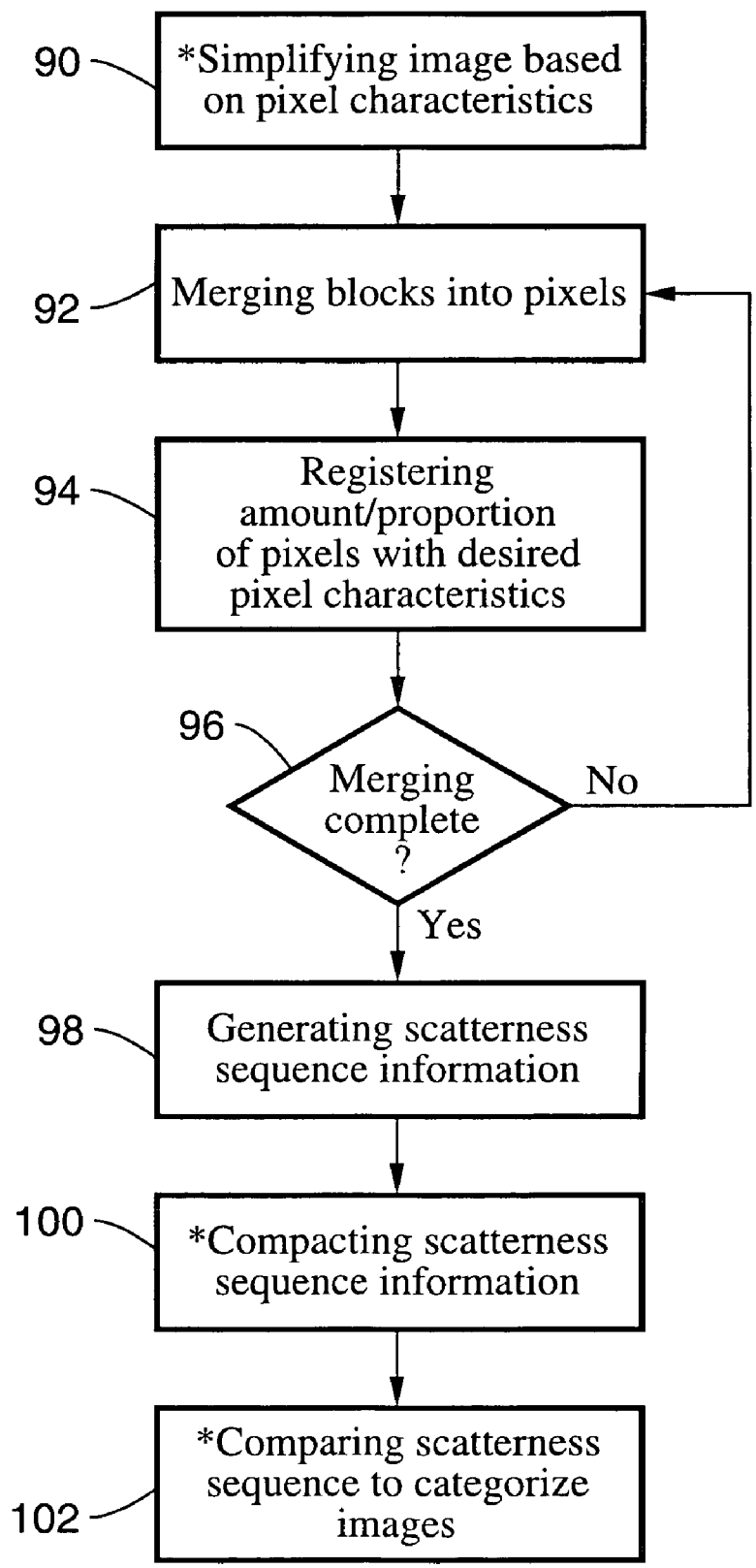
FIG. 5 is a flowchart of quantizing the distribution of pixel characteristic according to an embodiment of the present invention.

FIG. 5 illustrates by way of example the method of quantifying the distribution of pixel characteristics within the image according to the scatterness measure within the invention can be summarized as a process comprising the following steps. The flowchart includes additional optional steps that provide a number of benefits. It should be recognized that the invention may be practiced with the aspects implemented separately, or in any desired combinations, without departing from the teachings of the present invention.

Block 90 represents an optional process of simplifying the image, or image portion, by reducing the number of states of the pixels in response to the selected pixel characteristics. For example, pixels that match the characteristics are set to a first value, and those that don't match are set to a second value. The images may be simplified prior to, or during, merging to speed the merging and registration process.

In block 92 a merging process is executed in which each block of pixels from within a plurality of pixel blocks within an image, or frame of a video and so forth, is merged into a single pixel. In this process the multiple blocks in the original image are merged to create multiple pixels in the merged image. In addition, each resultant pixel represents the characteristics of the pixel block which was merged to create the pixel.

In block 94 the number, or proportion, of pixels having a desired pixel characteristic, or range of characteristics within the pixels is registered as a measure of scatterness for that characteristic. The characteristics can be compared based on color, intensity, other detectable characteristics, ranges of characteristics, and combinations thereof.

In block 96 a determination is made as to whether sufficient merges have been completed to provide the distribution information. Embodiments of the invention can be implemented to terminate merging in any desired manner, such as when a single pixel is reached (can't go any further), when a fixed number of levels are generated, when the target image size has reached a threshold, when the results have reached a boundary (i.e., all in either first or second state), and so forth.

In block 98 the merging has been completed and a process executes to generate scatterness sequence information in response to the registration of characteristics for at least two of the merges, and more preferably a plurality of merge levels (e.g., 4, 5, 10, 16), whose upper bound depends on the number of pixels in the original image. For example, using the 2×2 merge process described an image size of 1024×1024 would merge to a single pixel at the $10^{th}$ merge level.

In block 100 an optional process is shown for compacting the scatterness information and/or scatterness sequence information. Mechanisms can be incorporated for changing the form of the scatterness sequence, such as for compressing the data, or otherwise putting it in a form to reduce storage or simplify comparisons. In the embodiment described, each scatterness value is converted to a more compact logarithmic value. However, it should be appreciated that not only the individual scatterness values for each level can be compacted, but the sequence itself could be processed mathematically to generate one or more values that provide relevant information about the sequence (i.e., direction, rate, curve, and so forth).

In block 102 an optional comparison process is executed associated with an image selection or classification/categorization process, which is not described in detail herein. It should be appreciated, however, that the present invention can be utilized independently for assessing the distribution of pixel characteristics, or it may be used in combination with other characterization methods, in either case without departing from the teachings of the present invention. For example, the present distribution characterization mechanisms can be used in combination with assessing the amounts of different colors in the image, shape delineation methods, edge and line detections, pattern matching, and so forth. It should be noted for example, that the ability to search for images and other media on the Internet is becoming an important feature set for search engines, as well as other applications in general.

6. Moving Beyond 2D Images

It should first be appreciated that the technique is applicable to frames of video as well as to images. It should be appreciated that when gathering information about video it is preferred that information would be generated about sample frames (images) from the video stream, instead of the entire video. Processing the entire video sequence is possible with the technique, although in most applications the bandwidth reduction available in response to sampling would be preferable. Samples, for example, may be collected at a time offset after a scene change is detected. It will be appreciated that a number of mechanisms can be utilized for sampling frames from a video to yield images upon which the present invention can be applied.

Although the majority of images and video are currently two dimensional, it should be also appreciated that the present invention can be practiced on image data exceeding two dimensions. For example the method is operable with three dimensional holographic image data, and holographic image data streams (video). In order to perform the merge with more than two dimensions, the additional dimensions are included in the merge algorithm. By way of example, a three dimensional pixel block may contain 2×2×2 pixels (total of 8 pixels), wherein the simple merge case can be extended so that if any of the 8 pixels within the 2×2×2 matrix have the characteristics being assessed, then the resultant pixel from the merge will contain that characteristic. It will be recognized that the dimensional extension can be applied to any merge mechanisms without departing from the teachings of the present invention.

7. Conclusion

The described method for determining pixel distribution within an image can be beneficially implemented in a number of applications, and is amenable to embodiment in a range of forms, without departing from the teachings presented herein. It should be appreciated that any number of pixel characteristics of color and/or intensity, ranges thereof, or other discernable pixel aspects can be assessed according to distribution within the image, and the merging of blocks into pixels and the generation of scatterness sequence information. Furthermore, an approach has been described for compacting the sequence, wherein other known approaches for compacting data can be utilized according to these teachings without departing from the teachings of the present invention. The use of the scatterness sequence information within an image selection or categorization process, or application, is also described.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of quantifying scatterness within images or video frames based on pixel characteristics, comprising:
    (a) simplifying images in response to detection of desired pixel characteristics by setting each pixel of an image to a first state indicative of pixels lacking the desired characteristic or range of characteristics, or a second state indicative of pixels possessing the desired pixel characteristic or range of characteristics, so as to reduce possible states of each pixel;
    (b) merging each block of pixels from within a plurality of pixel blocks within an image into a collection of single pixels having either said first state or said second state; said merging is performed in response to execution of programming within a computer processing device;
    (c) registering the number or proportion of pixels having said second state within the pixels;
    wherein every level in the merging and registration process is based on one of two pixel states;
    (d) repeating steps (b) and (c) until a desired level of merging is reached; and
    (e) generating scatterness sequence information in response to determining a merging rate of pixels of said second state for at least two of the merges;
    wherein said quantifying of scatterness is performed within a classification or comparison of images or video frames.

2. A method as recited in claim 1, wherein said images or video comprises at least image or video of at least two dimensions.

3. A method as recited in claim 1, wherein said pixel characteristics comprise color characteristics, intensity characteristics, or a combination of color and intensity characteristics.

4. A method as recited in claim 1, further comprising:
    comparing the scatterness sequence for classifying the image according to said desired pixel characteristics;
    wherein the scatterness sequence is either directly compared or compared after first compacting it by converting it to a logarithmic value.

5. A method as recited in claim 1, further comprising:
    comparing the scatterness sequence for classifying the image according to said desired pixel characteristic;
    wherein the scatterness sequence is either directly compared or compared after first compacting it by converting it to a logarithmic value; and
    comparing a rate of change in the scatterness sequence for classifying said desired pixel characteristics.

6. A method as recited in claim 1, wherein merging of blocks of pixels into a collection of single pixels comprises setting the merged pixel to have s selected characteristic in response to detecting that the number of pixels possessing the selected pixel characteristic, or range of selected pixel characteristics, exceeds a predetermined threshold.

7. A method as recited in claim 1:
    wherein merging of blocks of pixels into a collection of single pixels comprises setting the merged pixels to have a selected pixel characteristic in response to detecting that the number of pixels possessing the selected pixel characteristic, or range of selected pixel characteristics, exceeds a predetermined threshold; and
    wherein said predetermined threshold comprises a condition in which at least one pixel in the block of pixels possesses the selected pixel characteristics.

8. A method as recited in claim 1:
    wherein merging of blocks of pixels into a collection of single pixels comprises setting the merged pixels to have a selected pixel characteristic in response to detecting that the number of pixels possessing the selected pixel characteristic, or range of selected pixel characteristics, exceeds a predetermined threshold;
    wherein merging of blocks of pixels into a collection of single pixels further comprises adjusting a state of adjacent pixels in response to the positioning of pixels having selected pixel characteristics within the block of pixels; and
    wherein the state of adjacent pixels is adjusted to a first state indicative of pixels lacking selected pixel characteristic, or a second state indicative of pixels possessing the selected pixel characteristics.

9. A method as recited in claim 1:
    wherein merging of blocks of pixels into a collection of single pixels is performed according to, $$f_{i+1}[m,n] = 0 \quad \text{if} \quad \begin{cases} f_i[2m+1, 2n] = 0, \\ f_i[2m, 2n+1] = 0, \\ f_i[2m+1, 2n] = 0, \\ f_i[2m+1, 2n+1] = 0; \end{cases}$$

$$f_i[m,n] = 1 \quad \text{if} \quad f_i[2m, 2n] = 1;$$

$$f_{i+1}[m,n] = 1 \quad \text{if} \quad \begin{cases} f_i[2m+1, 2n] = 0, \\ f_i[2m, 2n+1] = 1, \\ f_i[2m+1, 2n] = 1; \end{cases}$$

$$\begin{aligned} f_{i+1}[m,n] &= 1, \\ f_i[2m, 2n+2] &= 0, \\ f_i[2m+1, 2n+2] &= 0 \end{aligned} \quad \text{if} \quad \begin{cases} f_i[2m, 2n] = 0, \\ f_i[2m+1, 2n] = 0, \\ f_i[2m, 2n+1] = 1; \end{cases}$$

$$\begin{aligned} f_{i+1}[m,n] &= 1, \\ f_i[2m+2, 2n] &= 0, \\ f_i[2m+2, 2n+1] &= 0 \end{aligned} \quad \text{if} \quad \begin{cases} f_i[2m, 2n] = 0, \\ f_i[2m+1, 2n] = 1, \\ f_i[2m, 2n+1] = 0; \end{cases}$$

$$\begin{aligned} f_{i+1}[m,n] &= 1, \\ f_i[2m+1, 2n+2] &= 0, \\ f_i[2m+2, 2n+1] &= 0, \\ f_i[2m+2, 2n+2] &= 0 \end{aligned} \quad \text{if} \quad \begin{cases} f_i[2m, 2n] = 0, \\ f_i[2m, 2n+1] = 0, \\ f_i[2m+1, 2n] = 0, \\ f_i[2m+1, 2n+1] = 1. \end{cases}$$

wherein $f_i[m,n]$ denotes the image pixel at position [m,n] at the ith level, while $f_{i+1}[m,n]$ represents the pixel as a result of the merge.

10. A method as recited in claim 1, further comprising:
    simplifying the image based on pixel characteristics by converting the image into an image having pixels in either a first state indicative of pixels lacking the desired characteristic, or a second state indicative of pixels possessing the desired pixel characteristics;
    wherein the simplifying step is performed prior to merging of the pixels toward speeding up the merge process.

11. A method of quantifying scatterness within images or video frames based on characteristics, comprising:
    (a) merging each block of pixels from within a plurality of pixel blocks within an image into a collection of single pixels, which are set to either a first state indicative of pixels lacking a desired characteristic or range of characteristics, or a second state indicative of pixels possessing the desired pixel characteristic or range of characteristics;
said merging is performed in response to execution of programming within a computer processing device;
(b) registering the number or proportion of pixels having a desired pixel characteristic, or range of characteristics, within the pixels as a measure of scatterness for that characteristic;
wherein said pixel characteristics comprise color characteristics, intensity characteristics, or a combination of color and intensity characteristics;
(c) repeating steps (a) and (b) until a desired level of merging is reached; and
(d) generating scatterness sequence information in response to the registration of pixel characteristics for at least two of the merges;
wherein said quantifying of scatterness is performed within a classification or comparison of images or video frames.

12. A method as recited in claim 11, further comprising; (e) comparing the scatterness sequence of the image with other images, or with classification thresholds for classifying the image according to the selected pixel characteristic.

13. A method as recited in claim 11, further comprising
comparing the scatterness sequence of the image with other images, or with classification thresholds for classifying the image according to the selected pixel characteristic;
wherein said comparing comprises comparing a rate of change in the scatterness sequence for classifying the selected pixel characteristic.

14. A method as recited in claim 11, wherein merging of blocks of pixels into a collection of single pixels comprises setting the merged pixel to have the selected pixel characteristic in response to detecting that the number of pixels possessing the selected pixel characteristic, or a range of selected pixel characteristics, exceeds a predetermined threshold.

15. A method as recited in claim 11:
wherein merging of blocks of pixels into a collection of single pixels comprises setting the mered pixel to have the selected pixel characteristic in response to detecting that the number of pixels possessing the selected pixel characteristic, or a range of selected pixel characteristics, exceeds a predetermined threshold; and
wherein said predetermined threshold comprises a condition in which at least one pixel in the block of pixels possesses the selected pixel characteristics.

16. A method as recited in claim 11:
wherein merging of blocks of pixels into a collection of single pixels comprises setting the merged pixel to have the selected pixel characteristic in response to detecting that the number of pixels possessing the selected pixel characteristic, or a range of selected pixel characteristics, exceeds a predetermined threshold;
wherein merging of blocks of pixels into a collection of single pixels further comprises adjusting a state of adjacent pixels in response to positioning of pixels having the selected characteristics within the pixel block; and
wherein the state is adjusted to a first state indicative of pixels lacking the selected pixel characteristic, or a second state indicative of pixels possessing the selected pixel characteristics.

17. A method of classifying images or video frames based on quantifying scatterness sequences of pixel characteristics, comprising:

(a) merging each block of pixels from within a plurality of pixel blocks within an image into a collection of single pixels based on setting the resultant pixel to have either a first state indicative of pixels lacking the desired characteristic or range of characteristics, or a second state indicative of pixels possessing a selected pixel characteristic, or range of selected pixel characteristics, if the number of pixels within the pixel block that possess the selected pixel characteristic, or range of selected pixel characteristics, exceeds a predetermined threshold;
said merging is performed in response to execution of programming within a computer processing device;
(b) registering the number or proportion of pixels having said second state within the image or a selected portion of the image;
wherein said selected pixel characteristics comprise color characteristics, intensity characteristics, or a combination of color and intensity characteristics;
(c) merging blocks of pixels formed from said single pixels based on setting the resultant pixel to have either a first state indicative of pixels having said first state, or a second state indicative of pixels having said second state;
(d) registering the number or proportion of pixels having said second state, within the image or a selected portion of the image;
(e) repeating steps (c) and (d) until a selected number of merges are performed, or the resultant image size reaches a threshold value;
(f) generating scatterness sequence information in response to determining a merging rate of pixels of said second state;
wherein every level in the registration process is based on one of two pixel states; and
(g) comparing the scatterness sequence of the image with other images, or with classification thresholds for classifying the image according to that selected pixel characteristic.

18. A method as recited in claim 17, further comprising comparing the scatterness sequence of the image with scatterness sequences of other images, or with scatterness classification thresholds for classifying the image according to that selected pixel characteristic.

19. A method as recited in claim 17, wherein said
comparing comprises comparing a rate of change in the scatterness sequence for classifying the image characteristics.

20. A method as recited in claim 17, wherein merging of blocks of pixels into a collection of single pixels comprises setting the merged pixel to have the selected pixel characteristic in response to detecting that the number of pixels possessing the selected pixel characteristic, or range of selected pixel characteristics, exceeds a predetermined threshold.

21. A method of quantifying scatterness within images or video frames based on pixel characteristics, comprising:
(a) merging each block of pixels from within a plurality of pixel blocks within an image into a collection of single pixels;
said merging is performed in response to execution of programming within a computer processing device;
(b) registering the number or proportion of pixels having a desired pixel characteristic, or range of characteristics, within the pixels as a measure of scatterness for that characteristic;
(c) repeating steps (a) and (b) until a desired level of merging is reached; and (d) generating scatterness sequence information in response to the registration of characteristics for at least two of the merges;

wherein said merging of blocks of pixels into a collection of single pixels is performed according to, $$f_{i+1}[m, n] = 0 \text{ if } \begin{cases} f_i[2m, 2n] = 0, \\ f_i[2m, 2n+1] = 0, \\ f_i[2m+1, 2n] = 0, \\ f_i[2m+1, 2n+1] = 0, \end{cases}$$

$$f_{i+1}[m, n] = 1 \text{ if } f_i[2m, 2n] = 1;$$

$$f_{i+1}[m, n] = 1 \text{ if } \begin{cases} f_i[2m, 2n] = 0, \\ f_i[2m, 2n+1] = 1, \\ f_i[2m+1, 2n] = 1; \end{cases}$$

$$\left. \begin{aligned} f_{i+1}[m, n] &= 1, \\ f_i[2m, 2n+2] &= 0, \\ f_i[2m+1, 2n+2] &= 0 \end{aligned} \right\} \text{ if } \begin{cases} f_i[2m, 2n] = 0, \\ f_i[2m+1, 2n] = 0, \\ f_i[2m, 2n+1] = 1; \end{cases}$$

-continued $$\left. \begin{aligned} f_{i+1}[m, n] &= 1, \\ f_i[2m+2, 2n] &= 0, \\ f_i[2m+2, 2n+1] &= 0 \end{aligned} \right\} \text{ if } \begin{cases} f_i[2m, 2n] = 0, \\ f_i[2m+1, 2n] = 1, \\ f_i[2m, 2n+1] = 0; \end{cases}$$

$$\left. \begin{aligned} f_{i+1}[m, n] &= 1, \\ f_i[2m+1, 2n+2] &= 0, \\ f_i[2m+2, 2n+1] &= 0, \\ f_i[2m+2, 2n+2] &= 0, \end{aligned} \right\} \text{ if } \begin{cases} f_i[2m, 2n] = 0, \\ f_i[2m, 2n+1] = 0, \\ f_i[2m+1, 2n] = 0, \\ f_i[2m+1, 2n+1] = 1; \text{ and} \end{cases}$$

wherein fi[m, n] denotes the image pixel at position [m, n] at the ith level, while fi+1[m, n] represents the pixel as a result of the merge;

wherein said quantifying of scatterness is performed within a classification or comparison of images or video frames.

* * * * *

UNITED STATES PATENT AND TRADEMARK OFFICE
CERTIFICATE OF CORRECTION

PATENT NO. : 7,609,891 B2  Page 1 of 1
APPLICATION NO. : 11/217942
DATED : October 27, 2009
INVENTOR(S) : Pingshan Li It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 781 days.

Signed and Sealed this

Twelfth Day of October, 2010

David J. Kappos
*Director of the United States Patent and Trademark Office*